US011925933B2

(12) United States Patent
Weitz et al.

(10) Patent No.: US 11,925,933 B2
(45) Date of Patent: Mar. 12, 2024

(54) SYSTEMS AND METHODS FOR THE COLLECTION OF DROPLETS AND/OR OTHER ENTITIES

(71) Applicant: President and Fellows of Harvard College, Cambridge, MA (US)

(72) Inventors: David A. Weitz, Cambridge, MA (US); Kiryakos S. Mutafopulos, Cambridge, MA (US); Thomas Hufnagel, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 784 days.

(21) Appl. No.: 16/093,178

(22) PCT Filed: Apr. 14, 2017

(86) PCT No.: PCT/US2017/027545
§ 371 (c)(1),
(2) Date: Oct. 12, 2018

(87) PCT Pub. No.: WO2017/180949
PCT Pub. Date: Oct. 19, 2017

(65) Prior Publication Data

US 2019/0118182 A1 Apr. 25, 2019

Related U.S. Application Data

(60) Provisional application No. 62/323,544, filed on Apr. 15, 2016.

(51) Int. Cl.
*B01L 3/00* (2006.01)

(52) U.S. Cl.
CPC ... *B01L 3/502761* (2013.01); *B01L 3/502753* (2013.01); *B01L 3/502746* (2013.01);
(Continued)

(58) Field of Classification Search
None
See application file for complete search history.

(56) References Cited

U.S. PATENT DOCUMENTS

| | | | |
|---|---|---|---|
| 5,512,131 | A | 4/1996 | Kumar et al. |
| 6,355,198 | B1 | 3/2002 | Kim et al. |

(Continued)

FOREIGN PATENT DOCUMENTS

| | | | |
|---|---|---|---|
| EP | 1525916 A1 | 4/2005 | |
| WO | WO 1996/029629 A2 | 9/1996 | |

(Continued)

OTHER PUBLICATIONS

European Office Action dated Sep. 27, 2021 for Application No. EP 17783188.0.

(Continued)

*Primary Examiner* — Lore R Jarrett
(74) *Attorney, Agent, or Firm* — Wolf, Greenfield & Sacks, P.C.

(57) ABSTRACT

The present invention generally relates to microfluidic devices. In some aspects, various entities, such as droplets or particles, may be contained within a microfluidic device, e.g., within collection chambers or other locations within the device. In some cases, the entities may be released from such locations, e.g., in a sequential pattern, or an arbitrary pattern. In some cases, the entities may be imaged, reacted, analyzed, etc. while contained within the collection chambers. Other aspects are generally directed to methods of making or using such devices, kits involving such devices, or the like.

20 Claims, 6 Drawing Sheets

(52) U.S. Cl.
CPC .................. *B01L 2200/0652* (2013.01); *B01L 2200/0668* (2013.01); *B01L 2200/0673* (2013.01); *B01L 2300/0681* (2013.01); *B01L 2300/0816* (2013.01); *B01L 2300/0861* (2013.01); *B01L 2300/0864* (2013.01); *B01L 2300/0883* (2013.01); *B01L 2300/123* (2013.01); *B01L 2400/0487* (2013.01); *B01L 2400/086* (2013.01)

(56) References Cited

U.S. PATENT DOCUMENTS

| | | | |
|---|---|---|---|
| 8,765,485 B2 | 7/2014 | Link et al. | |
| 8,986,628 B2 | 3/2015 | Stone et al. | |
| 9,038,919 B2 | 5/2015 | Link et al. | |
| 9,068,699 B2 | 6/2015 | Fraden et al. | |
| 9,664,619 B2 | 5/2017 | Boehm et al. | |
| 10,828,641 B2 | 11/2020 | Boehm et al. | |
| 11,498,072 B2 | 11/2022 | Weitz et al. | |
| 2005/0118070 A1* | 6/2005 | Griss | F16K 99/0017 422/400 |
| 2005/0172476 A1 | 8/2005 | Stone et al. | |
| 2006/0163385 A1 | 7/2006 | Link et al. | |
| 2007/0003442 A1 | 1/2007 | Link et al. | |
| 2011/0151578 A1 | 6/2011 | Abate et al. | |
| 2014/0026968 A1* | 1/2014 | Abate | B01L 3/5027 137/1 |
| 2014/0051062 A1 | 2/2014 | Vanapalli et al. | |
| 2014/0246098 A1 | 9/2014 | Agresti et al. | |
| 2014/0378352 A1 | 12/2014 | Daridon | |
| 2015/0276562 A1 | 10/2015 | Fraden et al. | |
| 2015/0303444 A1 | 12/2015 | Manalis et al. | |
| 2017/0225167 A1 | 8/2017 | Boehm et al. | |
| 2021/0086183 A1 | 3/2021 | Boehm et al. | |
| 2023/0078810 A1 | 3/2023 | Weitz et al. | |

FOREIGN PATENT DOCUMENTS

| | | |
|---|---|---|
| WO | WO 2001/089787 A2 | 11/2001 |
| WO | WO 2004/002627 A2 | 1/2004 |
| WO | WO 2004/091763 A2 | 10/2004 |
| WO | WO 2005/021151 A1 | 3/2005 |
| WO | WO 2007/030501 A2 | 3/2007 |
| WO | WO 2008/021123 A1 | 2/2008 |
| WO | WO 2009/020633 A2 | 2/2009 |
| WO | WO 2009/120254 A1 | 10/2009 |
| WO | WO 2009/134395 A2 | 11/2009 |
| WO | WO 2009/139898 A2 | 11/2009 |
| WO | WO 2010/151776 A2 | 12/2010 |
| WO | WO 2015/200616 A1 | 12/2015 |

OTHER PUBLICATIONS

Chinese Office Action dated Jul. 13, 2020 for Application No. CN 201780032681.1.
Chinese Office Action dated Apr. 21, 2021 for Application No. CN 201780032681.1.
Partial European Search Report dated Jul. 26, 2019 for Application No. EP 17783188.0.
Extended European Search Report dated Nov. 5, 2019 for Application No. EP 17783188.0.
European Office Action dated Jun. 17, 2020 for Application No. EP 17783188.0.
European Office Action dated Apr. 14, 2021 for Application No. EP 17783188.0.
International Search Report and Written Opinion dated Jul. 3, 2017 in connection with International Application No. PCT/US2017/027545.
International Preliminary Report on Patentability dated Oct. 25, 2018 in connection with International Application No. PCT/US2017/027545.
Angell et al., Silicon micromechanical devices. Scientific American, 1983; 248(4), 44-55.
Clausell-Tormos et al., Droplet-based microfluidic platforms for the encapsulation and screening of Mammalian cells and multicellular organisms. Chem Biol. May 2008;15(5):427-37. doi: 10.1016/j.chembiol.2008.04.004.
Duffy et al., Rapid Prototyping of Microfluidic Systems in Poly(dimethylsiloxane). Anal Chem. Dec. 1, 1998;70(23):4974-84. doi: 10.1021/ac980656z.
Holtze et al., Biocompatible surfactants for water-in-fluorocarbon emulsions. Lab Chip. Oct. 2008;8(10):1632-9. doi: 10.1039/b806706f.
Jin et al., A microfluidic device enabling high-efficiency single cell trapping. Biomicrofluidics. Jan. 7, 2015;9(1):014101. doi: 10.1063/1.4905428. eCollection Jan. 2015.
Khalili et al., Numerical simulation of hydrodynamic-based microfluidic device for single cell trapping. 2014 IEEE Conference on Biomedical Engineering and Sciences (IECBES). Kuala Lumpur, Malaysia. Dec. 8-10, 2014: 479-484. 10.1109/IECBES.2014.7047546.
Whitesides et al. Soft lithography in biology and biochemistry. Annu Rev Biomed Eng. 2001;3:335-73.
Xia et al., Soft lithography. Annual Review of Material Science. 1998; 28:153-184.
U.S. Appl. No. 17/060,354, filed Oct. 1, 2020, Weitz et al.
CN 201780032681.1,Nov. 10, 2021, Chinese Office Action.
Chinese Office Action dated Nov. 10, 2021 for Application No. CN 201780032681.1.
European Office Action dated Jul. 20, 2022 for Application No. EP 17783188.0.
U.S. Appl. No. 17/964,771, filed Oct. 12, 2022, Weitz et al.
CA 3020913, Jan. 30, 2023, Canadian Office Action.
Canadian Office Action dated Jan. 30, 2023 for Canadian Application No. 3020913.

* cited by examiner

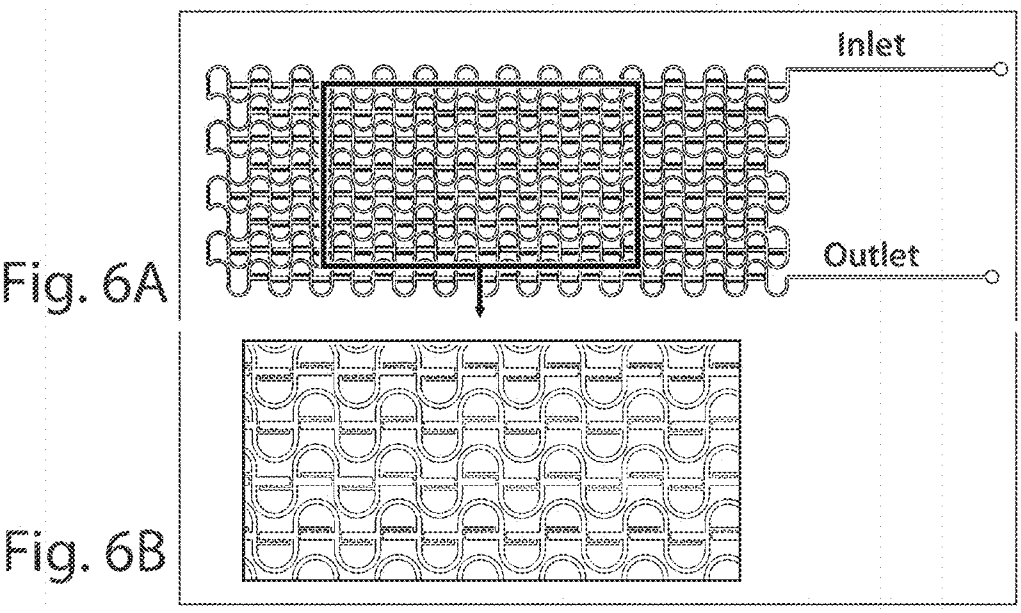
Fig. 6A
Fig. 6B
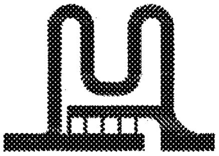
Fig. 7
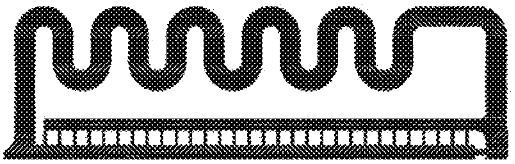
Fig. 8
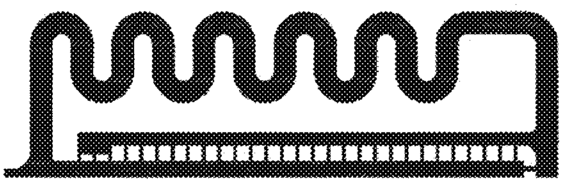
Fig. 9

SYSTEMS AND METHODS FOR THE COLLECTION OF DROPLETS AND/OR OTHER ENTITIES

RELATED APPLICATIONS

This application is a national stage filing under 35 U.S.C. § 371 of International Patent Application Serial No. PCT/US2017/027545, filed Apr. 14, 2017, which claims the benefit of U.S. Provisional Patent Application Ser. No. 62/323,544, filed Apr. 15, 2016, by Weitz, et al., each of which is incorporated herein by reference in its entirety.

FIELD

The present invention generally relates to microfluidic devices able to collect droplets or other entities.

BACKGROUND

The ability to accurately control and manipulate microparticles in liquids is fundamental for many applications in biology, medicine, and microfluidics. Different approaches have been investigated and developed for the manipulation of particles in liquid. Techniques have been suggested for screening and sorting drops. See, e.g., U.S. Pat. Nos. 8,765,485, 8,986,628, or 9,038,919, each incorporated herein by reference in its entirety. However, the collected droplets are typically pooled together, which can make subsequent analysis difficult.

SUMMARY

The present invention generally relates to microfluidic devices able to collect droplets or other entities. The subject matter of the present invention involves, in some cases, interrelated products, alternative solutions to a particular problem, and/or a plurality of different uses of one or more systems and/or articles.

In one aspect, the present invention is generally directed to an apparatus for collecting microfluidic entities. In one set of embodiments, the apparatus comprises a first microfluidic channel and a second microfluidic channel, each of the channels fluidly connecting a first location and a second location. In some cases, the first microfluidic channel comprises a collection chamber having an inlet and two or more outlets, each of the inlet and the two or more outlets having a cross-sectional area, the cross-sectional area of the inlet being larger than each of the cross-sectional areas of each of the outlets, whereby the collection chamber is able to collect microfluidic entities having a cross-sectional area greater than the cross-sectional areas of each of the outlets and smaller than the cross-sectional area of the inlet. In certain embodiments, the outlets are spaced such that microfluidic entities collectable by the collection chamber can block only one outlet within the collection chamber at a time. In some instances, the first microfluidic channel, in the absence of entities, has a flow resistance that is lower than a flow resistance of the second microfluidic channel, and when the first microfluidic channel contains one or more microfluidic entities, has a flow resistance that is higher than a flow resistance of the second microfluidic channel.

The apparatus, in another set of embodiments, comprises a first microfluidic channel and a second microfluidic channel, each of the channels fluidly connecting a first location and a second location. In certain embodiments, the first microfluidic channel comprises a collection chamber having an inlet and two or more outlets, each of the inlets and outlets having cross-sectional width, the cross-sectional width of the inlet being larger than each of the cross-sectional widths of each of the outlets. In some cases, the outlets are spaced at a distance that is between 75% and 125% of the width of the inlet. In some instances, the first microfluidic channel has a flow resistance that is lower than a flow resistance of the second microfluidic channel.

According to yet another set of embodiments, the apparatus comprises a first microfluidic channel and a second microfluidic channel, each of the channels fluidly connecting a first location and a second location. In some embodiments, the first microfluidic channel comprises a collection chamber having an inlet, an outlet, and an actuation channel that, when fluid flows through actuation channel, is able to cause a droplet within the collection chamber to exit the collection chamber. In certain cases, the first microfluidic channel has a flow resistance that is lower than a flow resistance of the second microfluidic channel.

In accordance with yet another set of embodiments, the apparatus comprises a flow pathway comprising a plurality of branch points, where at least some of the branch points are paired such that the paired branch points are fluidly connected by a first microfluidic channel and a second microfluidic channel. In some cases, at least some of the first microfluidic channels each comprise a collection chamber and an actuation channel that, when fluid flows therethrough, is able to cause entities within the collection chamber to exit the collection chamber.

Still another set of embodiments is directed to an apparatus comprising a flow pathway comprising a plurality of branch points. In some cases, at least some of the branch points are paired such that the paired branch points are fluidly connected by a first microfluidic channel and a second microfluidic channel. According to certain embodiments, at least some of the first microfluidic channels each comprise a collection chamber and an actuation channel. In various instances, each of the actuation channels is in fluid communication with a common inlet.

In another aspect, the present invention is generally directed to a microfluidic apparatus comprising a first microfluidic channel and a second microfluidic channel, each of the channels fluidly connecting a first location and a second location. In some embodiments, the first microfluidic channel comprises a collection chamber having an inlet and an outlet, each of the inlet and the outlet having a cross-sectional area, the cross-sectional area of the inlet being larger than the cross-sectional area of the outlet, whereby the collection chamber is able to collect a microfluidic entities having a cross-sectional area greater than the cross-sectional area of the outlet and smaller than the cross-sectional area of the inlet. The apparatus may also comprise an actuation channel that, when fluid flows therethrough, is able to cause entities within the collection chamber to exit the collection chamber. In certain cases, the first microfluidic channel, in the absence of entities, has a flow resistance that is lower than a flow resistance of the second microfluidic channel, and when the first microfluidic channel contains one or more microfluidic entities, has a flow resistance that is higher than a flow resistance of the second microfluidic channel.

Still another aspect of the present invention is generally directed to a method. In accordance with one set of embodiments, the method includes an act of flowing two or more microfluidic entities into a collection chamber comprising an inlet and a plurality of outlets. In some cases, each of the entities that enters the collection chamber blocks one outlet within the collection chamber until each outlet of the collection chamber is blocked by a microfluidic droplet. In another set of embodiments, the method includes flowing two or more microfluidic entities into a collection chamber comprising an inlet and a plurality of outlets. In some cases, each of the entities that enters the collection chamber blocks one outlet within the collection chamber until all of the outlets but one of the collection chamber is blocked by a microfluidic droplet.

The method, in yet another set of embodiments, includes an act of flowing a plurality of microfluidic entities through a microfluidic device comprising a first microfluidic channel and a second microfluidic channel. In some embodiments, each of the channels fluidly connecting a first location and a second location. In certain cases, the first microfluidic channel comprises a collection chamber having an inlet and two or more outlets. In some instances, each of the entities that enters the collection chamber blocks one outlet within the collection chamber until each of the outlets of the collection chamber is blocked by a microfluidic droplet. In some cases, upon blockage of each of the outlets of the collection chamber of the first microfluidic channel by microfluidic entities, the microfluidic entities flow through the second microfluidic channel.

In accordance with another set of embodiments, the method includes flowing a plurality of microfluidic entities through a microfluidic device comprising a first microfluidic channel and a second microfluidic channel, each of the channels fluidly connecting a first location and a second location. According to some embodiments, the first microfluidic channel comprises a collection chamber having an inlet and two or more outlets. In certain cases, each of the entities that enters the collection chamber blocks one outlet within the collection chamber until each of the outlets but one of the collection chamber is blocked by a microfluidic droplet. In some embodiments, upon blockage of each of the outlets of the collection chamber of the first microfluidic channel by microfluidic entities, the microfluidic entities flow through the second microfluidic channel.

The method, in yet another set of embodiments, comprises acts of providing a microfluidic device comprising a flow pathway and a plurality of collection chambers, at least some of the collection chambers each containing two or more microfluidic entities, where at least some of the collection chambers fluidly connect two separate points along the flow pathway; and releasing entities from one of the collection chambers without releasing entities from other collection chambers.

The method, in accordance with one set of embodiments, includes acts of flowing a microfluidic entity into a collection chamber comprising an inlet and an outlet, where the droplet blocks the outlet within the collection chamber after entering the collection chamber, and flowing the microfluidic entity out of the collection chamber through the inlet by flowing a fluid into the collection chamber.

In another set of embodiments, the method comprises providing a microfluidic device comprising a flow pathway and a plurality of collection chambers, at least some of the collection chambers each containing two or more microfluidic entities, where at least some of the collection chambers fluidly connect two separate points along the flow pathway, and sequentially releasing the entities the collection chambers.

The method, in yet another set of embodiments, includes providing a microfluidic device comprising a flow pathway and a plurality of collection chambers, at least some of the collection chambers each containing two or more microfluidic entities, where at least some of the collection chambers fluidly connect two separate points along the flow pathway, and releasing the entities from one or more of the collection chambers by flowing fluid into at least the one or more collection chambers. In some embodiments, the fluid flows through a common channel in fluid communication with the collection chambers.

In still another set of embodiments, the method may include acts of providing a microfluidic device comprising a flow pathway and a plurality of collection chambers, at least some of the collection chambers each containing two or more microfluidic entities, where at least some of the collection chambers fluidly connect two separate points along the flow pathway, and exposing at least some of the microfluidic entities contained within the collection chambers to a common fluid.

In another aspect, the present invention encompasses methods of making one or more of the embodiments described herein, for example, a microfluidic device. In still another aspect, the present invention encompasses methods of using one or more of the embodiments described herein, for example, a microfluidic device.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 6A-6B illustrate a device comprising a plurality of collection chambers, in another embodiment of the invention;

FIG. 7 illustrates a device having a serpentine bypass flow path, in one embodiment of the invention;

FIG. 8 illustrates another device having a serpentine bypass flow path, in another embodiment of the invention;

FIG. 9 illustrates a collection chamber having outlets with various flow resistances, in yet another embodiment of the invention.

DETAILED DESCRIPTION

The present invention generally relates to microfluidic devices. In some aspects, various entities, such as droplets or particles, may be contained within a microfluidic device, e.g., within collection chambers or other locations within the device. In some cases, the entities may be released from such locations, e.g., in a sequential pattern, or an arbitrary pattern. In some cases, the entities may be imaged, reacted, analyzed, etc. while contained within the collection chambers. Other aspects are generally directed to methods of making or using such devices, kits involving such devices, or the like.

Figure 1A:
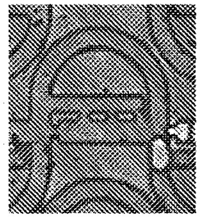
FIGS. 1A-1N illustrate certain collection chambers in some embodiments of the invention.
Figure 1B:
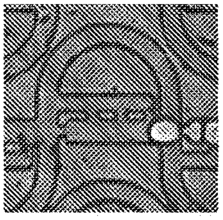
Figure 1C:
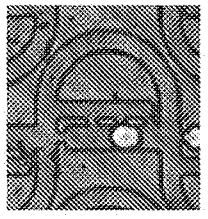

Certain aspects of the invention are directed to various systems and methods for containing or manipulating various entities, such as droplets or particles within a microfluidic device, e.g., within collection chambers or other locations within the device. Manipulation of droplets or other species can be useful for a variety of applications, including testing for reaction conditions, e.g., in chemical, and biological assays. For instance, one example of an embodiment of the invention is now shown with reference to FIGS. 1A-1N. In this example, three microfluidic droplets are collected in a collection chamber. It should be understood that, although droplets are often discussed herein, this is solely by way of ease of presentation only, and that in other embodiments, other suitable entities, such as particles, gels, or the like, may be used instead or in addition to droplets, and that the entities may be spherical or non-spherical in some cases.

Figure 1D:
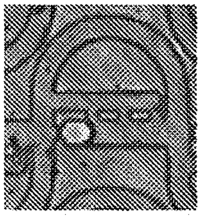
Figure 1E:
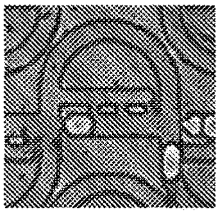
Figure 1F:
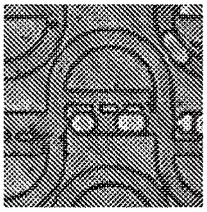
Figure 1G:
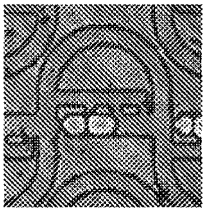
Figure 1H:
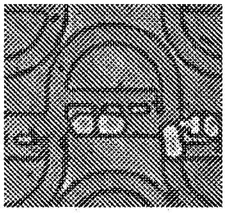
Figure 1I:
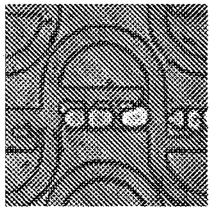
Figure 1J:
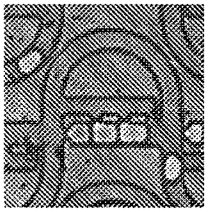
Figure 1K:
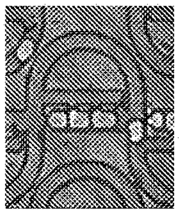
Figure 1L:
Figure 1M:
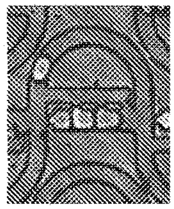
Figure 1N:
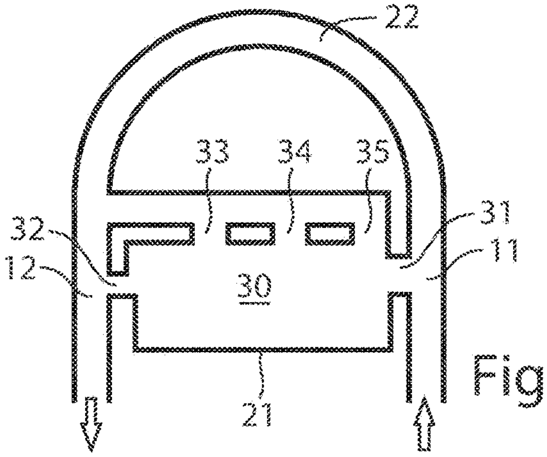

Turning first to FIG. 1N, a schematic diagram of one embodiment is illustrated. In this figure, a microfluidic device is shown comprising a first location 11, a second location 12, and two microfluidic channels or flow paths 21 and 22 fluidly connecting the first location and the second location. A fluid (e.g., containing droplets or other entities) can flow from location 11 to location 12, thereby defining a flow direction (as indicated by arrows). However, as location 11 and location 12 are branch points, fluid can flow through either paths 21 or 22, each defined by microfluidic channels.

Droplets entering first microfluidic channel 21 may become trapped and prevented from reaching second location 12, while droplets entering second microfluidic channel 22 may be able to flow freely to second location 12. Second microfluidic channel 22 is depicted here as being generally semicircular, although this is somewhat arbitrary and in other embodiments, second microfluidic channel 22 may have other shapes (e.g., more of a rectangular profile, or contain other compartments or features, etc.). As non-limiting examples, as shown in FIGS. 7-9, a "bypass" flow path may include microfluidic channels having various serpentine or zigzag profiles between the first and second locations. In addition, in some instances, parts of the flow path may also include straight segments.

Fluid, especially containing droplets or other entities, may have a preferred flow path, e.g., if the flow (hydrodynamic) resistance of one microfluidic channel is substantially less than the other. Thus, for example, if no droplets are present, fluid may flow preferentially through microfluidic channel 21 relative to microfluidic channel 22. However, it should be understood that this is merely a preference, and there will often be some flow occurring through both channels simultaneously, although the flow through one may be greater than the other.

Typically, droplets or other entities flowing into location 11 may follow the path of greatest fluid flow (or least flow resistance), and thus enter into microfluidic channel 21 instead of microfluidic channel 22. However, microfluidic channel 21 may contain a collection chamber 30 that prevents such droplets or other entities from exiting, e.g., to be able to reach location 12. For instance, as discussed below, the collection chamber may contain inlet 31 sized to allow droplets or other entities to enter, but have one or more outlets 32, 33, 34, and 35 that are sized to prevent such droplets or other entities from leaving. For instance, the outlets may have areas and/or widths that are too small to prevent such droplets or other entities from leaving. In such fashion, droplets or other entities entering the collection chamber may become trapped or contained therein. The outlets may also have the same or different sizes, e.g., as discussed herein.

Once collection chamber 30 has been sufficiently filled, e.g., with droplets or other entities, the resistance to the flow of fluid through collection chamber 30 and microfluidic channel 21 may increase. For example, the droplets or other entities may partially or completely block the outlets to collection chamber 30, thereby increasing resistance to the flow of fluid through the collection chamber. In some cases, such resistance may increase such that the flow (hydrodynamic) resistance within microfluidic channel 21 is greater than the flow resistance through microfluidic channel 22. This may cause fluid to preferentially flow through microfluidic channel 22 relative to microfluidic channel 21, e.g., due to lower flow resistance. Under such conditions, droplets or other entities entering location 11 may then flow around collection chamber 30 via microfluidic channel 22, rather than into it. Thus, microfluidic channel 22 may be thought of as a bypass channel to collection chamber 30, at least in some embodiments. Accordingly, in some cases, once collection chamber 30 has been sufficiently filled, droplets or other entities will then flow around it, e.g., reaching location 12 and reaching other, downstream portions of the microfluidic device. It should be understood that collection chamber 30 may be completely filled with droplets or other entities to increase the flow resistance through microfluidic channel 21, although this is not a requirement. In some cases, for example, collection chamber 30 may only be partially filled with droplets or other entities to increase the flow resistance, e.g., one or more droplets or other entities may still be able to enter the collection chamber.

In the embodiment shown in FIG. 1N, collection chamber 30 comprises a series of four outlets, which can be used to collect a series of 3 droplets before other droplets are passed around it. Collection chamber 30 is shown in this example as being substantially rectangular and able to collect droplets "single-file" or linearly, although this is by way of example only, and in other embodiments, other configurations and the ability to collect other numbers of droplets or other entities are also possible. A series of images showing the process of collecting droplets within collection chamber 30 is shown in FIGS. 1A-1M, with droplets entering from right to left. In these figures, a first droplet enters collection chamber 30 and essentially blocks one of the outlets (outlet 32) to collection chamber 30 (FIG. 1D). Similarly, a second droplet subsequently enters and blocks a second outlet (outlet 33) within collection chamber 30 (FIG. 1G), and a third droplet subsequently enters and blocks a third outlet (outlet 34) within collection chamber 30 (FIG. 1J). At this point, the resistance to flow within collection chamber 30, due to the blockage of outlets within collection chamber 30 by the droplets, has increased such that the flow resistance is now greater than the resistance of flow through microfluidic channel 22, although some flow may still occur in collection chamber 30 through outlet 35. However, a fourth droplet (entering in FIG. 1J) does not enter collection chamber 30, but instead flows through microfluidic channel 22 and thereby reaches location 12, bypassing collection chamber 3 (FIG. 1M).

Figure 2:
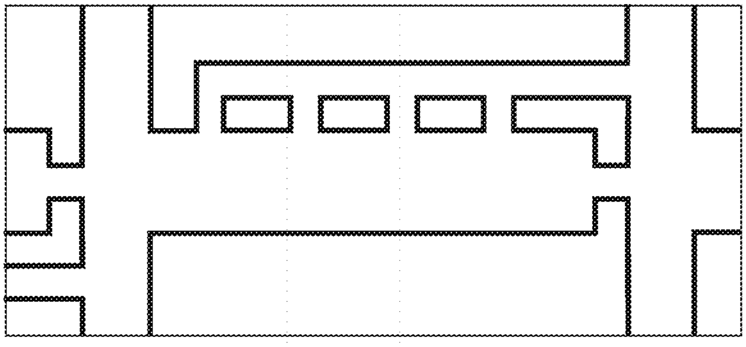
FIG. 2 illustrates a collection chamber in another embodiment of the invention.

Of course, it should be understood that in various embodiments, other numbers of droplets may be collected in a collection chamber (e.g., 1, 2, 3, 4, 5, 6, 7, 8, 9, 10, etc.

droplets). For example, an example of a collection chamber having 5 outlets is shown in FIG. 2. The collection chamber may be straight, or rectangular, and able to admit droplets single-file, or the collection chamber may have different shapes (e.g., a curved shape, one or more angles, etc.).

In some embodiments, a microfluidic system may comprise a first microfluidic channel and a second microfluidic channel, where each of the channels fluidly connects a first location and a second location. One (or both) of the microfluidic channels may comprise a collection chamber as discussed herein. The first and/or second locations may be branch points in some cases, e.g., where two or more microfluidic channels exit from a common location. Such branch points may be connected to other, downstream portions of the device (which may include other collection chambers, or other microfluidic channels or compartments, etc.).

A collection chamber can have one or more inlets and/or one or more outlets. In some cases, one or more of the inlets are sized to allow entry of a droplet or other entity, while one or more of the outlets are sized to prevent the exiting of a droplet or other entity. In some cases, the outlets will allow fluid to exit the collection chamber, e.g., while preventing the exiting of a droplet or other entity. For instance, the cross-sectional area of the inlets may be larger than each of the cross-sectional areas of each of the outlets, at least in certain embodiments. In addition, in some embodiments, one or more the outlets may be sized to prevent the exiting of a droplet or other entity, although under increased pressure, a droplet or other entity may be sufficiently deformed so as to be able to pass through the outlet.

The collection chamber may be able to collect one or more entities, e.g., droplets or other entities as discussed herein. For example, the collection chamber may be sized to collect, e.g., 1, 2, 3, 4, 5, 6, 7, 8, 9, 10, etc. droplets or other entities. The collection chamber may be sized to collect the entities in single-file, double-file, or in other arrangements. The collection chamber may be relatively straight, e.g., as shown in FIG. 1N, or have other geometries, such as having a curved shape or one or more angles, etc. In some cases, the collection chamber is substantially linear or substantially rectangular. The collection chamber may be able to collect any suitable number of droplets or other entities. For instance, the collection chamber may be sized to collect at least 1, at least 2, at least 3, at least 4, at least 5, at least 7, at least 10, at least 15, at least 20, at least 25, at least 30, at least 35, at least 40, at least 45, at least 50, at least 75, or at least 100 droplets or other entities.

The collection chamber may have one or more inlets. In some cases, the inlet may have a width or cross-sectional area (e.g., perpendicular to bulk fluid flow into the collection chamber) that is at least sufficient to allow the entry of a microfluidic droplet or other entity into the collection chamber. In some cases, the inlet may be substantially wider or larger to permit ready access. However, in certain embodiments, the inlet may be smaller, for example, in cases where a droplet or other entity can be "deformed" in some fashion to permit entry into the collection chamber. In some cases, for instance, the width or cross-sectional area of the inlet may be at least 50%, at least 60%, at least 70%, at least 80%, at least 90%, at least 100%, at least 125%, at least 150%, at least 200%, at least 300%, at least 400%, or at least 500% of the average diameter or cross-sectional area of the microfluidic droplets (or other entities) that are to be collected within the collection chamber.

The collection chamber may also have one or more outlets. The outlets may independently be of the same or different shapes, sizes, widths, or inner diameters, etc. In some cases, the outlets of the collection chamber may be spaced such that a microfluidic droplet collectable by the collection chamber can block only one outlet within the collection chamber at a time. The blockage of an outlet by a droplet or other entity can be partial or total, in various embodiments. The spacing between adjacent outlets may be regular or irregular. For instance, in certain embodiments, adjacent outlets may have a spacing that is within +/−20%, +/−10%, or +/−5% of the average spacing of adjacent outlets. For example, this may be useful to collect droplets or other entities that are substantially monodisperse, or have a characteristic diameter that is within +/−20%, +/−10%, or +/−5% of the average characteristic diameter, or have other properties such as those discussed herein.

In certain embodiments, the outlets may have a width or cross-sectional area that is substantially smaller than the droplets or other entities to be collected within the collection chamber. For example, the width or cross-sectional area of one or more of the outlets (or all of the outlets) may be less than 110%, less than 100%, less than 90%, less than 80%, less than 70%, less than 60%, less than 50%, less than 40%, less than 30%, less than 20%, or less than 10% of the width or cross-sectional area of the microfluidic droplets (or other entities) that are to be collected within the collection chamber. In some cases, the outlets may be sized such that a droplet or other entity is not able to exit the collection chamber, although under increased pressure, a droplet or other entity may be sufficiently deformed so as to be able to pass through the outlet. In addition, it should be understood that different outlets need not necessarily each have the same size or dimensions, although they can in some cases. In some embodiments, the collection chamber is able to collect droplets or other entities having a cross-sectional area greater than the cross-sectional areas of each of the outlets and smaller than the cross-sectional area of the inlet, although in other embodiments, other dimensions are also possible.

In addition, in some embodiments, the outlets may exhibit the same, or different, resistances to fluid flow therethrough. Fluid resistance may be controlled by controlling the shape of the outlet, e.g., by controlling one or more of the width, length, cross-sectional area, shape, etc. For example, one of the outlets may have a somewhat lower fluid flow resistance than the other outlets. For instance, an outlet may have a flow resistance that is reduced by at least 10%, at least 25%, at least 50%, at least 75%, etc. compared to the flow resistances of the other outlets, in certain embodiments. In some cases, this outlet may be used to control the exiting of fluids from the collection area, for example, under application of increased pressure to force the droplets or other entities to exit the collection chamber, which may thereby force the droplets or other entities to exit through the outlet of least flow resistance. In some cases, this outlet may be the one farthest from the inlet, although in other cases, a different outlet may have a lowered flow resistance.

It should be understood, however, that in other embodiments, more than one outlet may have a lowered flow resistance. For example, in some cases, one, two, or three or more outlets closest to the inlet of the collection chamber may have lowered flow resistance, e.g., compared to the other outlets. For instance, lowered flow resistance may be achieved by having outlets with a shorter length, and/or other dimensions (e.g., width, cross-sectional area, shape, or the like). This may be useful, for example, to minimize the flow of fluid through the collection chamber, especially when the collection chamber contains droplets or other entities, as these outlets may be the last to be blocked by droplets or other entities collected within the chamber. A non-limiting example of such a system may be seen in FIG. 9.

The outlets may be positioned at any suitable locations location within the collection chamber. For instance, the outlets may be positioned in one wall or side of the collection chamber, or in different locations, e.g., one or more may be positioned in an end wall of the collection chamber. In some cases, the outlets may be positioned on a wall orthogonal to the direction of bulk fluid flow within the collection chamber. In addition, in some embodiments the collection chamber comprises a plurality of outlets on a wall orthogonal to the direction of bulk fluid flow within the collection chamber, and at least one outlet exiting the collection chamber in a direction of bulk fluid flow within the collection chamber.

The outlets, if more than one is present for a collection chamber, may also have the same, or different widths or cross-sectional areas, as mentioned. For example, in some embodiments, an outlet may have a width or cross-sectional area that is within +/−20%, +/−10%, or +/−5% of the average widths or cross-sectional areas of the outlets. The outlets may also have substantially the same, or different, flow resistances. For example, in some embodiments, an outlet may have a flow (hydrodynamic) resistance that is within +/−20%, +/−10%, or +/−5% of the average flow resistance of the outlets.

In some embodiments, the width or cross-sectional area of the outlets may be generally related to the size of the inlet to the collection chamber. For instance, the width or cross-sectional area (e.g., perpendicular to bulk fluid flow therethrough) of the inlet may be substantially equal to the spacing or average spacing of outlets from the collection chamber, or wherein the outlets are spaced at a distance that is between 75% and 125%, between 80% and 120%, between 85% and 115%, between 90% and 110%, or between 95% and 105% of the width of the inlet. In some cases, however, the width of the inlet may be larger than the average spacing of the outlets, or the outlets may be spaced at a distance that is at least 75%, at least 80%, at least 85%, at least 90%, or at least 95% of the width of the inlet.

In some cases, some or all of the outlets may connect to a common channel, e.g., one that is fluidly connected to the second location. However, in some embodiments, one or more the outlets may be unconnected from each other, e.g., the outlets may connect to a second location, but not via a common channel.

In certain embodiments, e.g., in the absence of droplets (or other entities), the outlets of the collection chamber may collectively have a flow resistance that is lower than the bypass flow resistance, thereby preferentially allowing fluid (and entities such as droplets) to flow into the collection chamber. However, once one or more droplets have entered the collection chamber, e.g., blocking one or more of the outlets, the fluid resistance may increase, and in some cases, increase such that the flow resistance is greater than the bypass flow resistance, thereby causing more of the fluid flow (and entities such as droplets) to bypass the collection chamber. In some cases, e.g., as discussed, the flow resistance through the collection chamber and/or outlets may be controlled by controlling the width or cross-sectional areas of the collection chamber and/or outlets.

The device may also contain one or more bypass microfluidic channels, e.g., connecting point upstream of the collection chamber with a point downstream of the collection chamber without passing through the collection chamber. The bypass microfluidic channel may have any shape between these points, and may in some cases include additional chambers, branches or intersections with other microfluidic channels or the like. In other cases, however, the bypass microfluidic channel may be relatively uniform and smooth, e.g., to facilitate travel of droplets or other entities around the collection chamber. For example, in some cases, the bypass microfluidic channel may be relatively curved or serpentine, or the bypass microfluidic channel may contain one or more straight segments, angles, or the like.

In some cases, as previously discussed, the bypass microfluidic channel may be sized to have a flow resistance that is greater than the flow resistance through an empty collection chamber, but less than the empty collection chamber when the collection chamber is partially or fully filled with droplets or other entities. For example, the collection chamber may be at least 10%, at least 20%, at least 30%, at least 40%, at least 50%, at least 60%, at least 70%, at least 80%, at least 90%, or 100% full of droplets or other entities when the flow resistance through the collection chamber equals or exceeds the flow resistance through the bypass microfluidic channel.

The flow resistance of the bypass microfluidic channel may be controlled, for example, by controlling the length, width, shape, etc. of the channel. As a non-limiting example, the flow resistance of a bypass microfluidic channel may be increased by increasing the length of the channel; to fit the bypass channel around the collection chamber, the microfluidic channel may have a curved or serpentine shape, e.g., as is shown in FIG. 7 or 8.

While contained within the collection chambers, the droplets or other entities may be analyzed or reacted in some fashion. For example, one or more droplets or entities may be imaged, e.g., using microscopy, such as fluorescent microscopy, or one or more droplets or entities may be allowed to react in some fashion. For example, a fluid may be introduced to a collection chamber that can react or interact with the droplets or other entities in some fashion, e.g., to form a coating around the droplets or entities, to diffuse into the droplets or entities, to react with the surface of the droplets or entities, or the like. Other analytical techniques are also possible. In addition, in some cases, the droplets or entities may be allowed to remain undisturbed within the collection chamber, for instance, as a method of storing such droplets or entities (e.g., as in a library), to allow a certain reaction therein to proceed, to allow biological processes to take place (for example, if the droplets or other entities contain cells), or the like.

In addition, in some aspects of the invention, droplets or other entities contained within a collection chamber may be released from the chamber. In some cases, the release may be performed on an individual basis, i.e., droplets or other entities within a chamber may be released from the chamber without also simultaneously releasing other droplets or other entities from other chambers. In some cases, these may be released in a random or arbitrary fashion, e.g., arbitrarily selected by a user. For instance, certain droplets contained within collection chambers may be desirably released (for example, droplets in which a certain chemical reaction has been performed, droplets containing certain desired cells or other species, droplets which are fluorescent or colored (or are not fluorescent or colored), etc.), while droplets contained within other collection chambers are not released and are maintained within the collection chambers. In some cases, for example, one or more collection chambers within a device may be selected, at the same time or different times, to be released. The selection may be done, for example, by a user or by an automated system (e.g., an image acquisition system, such as a camera, connected to a computer, which is programmed to select collection chambers and/or droplets on the basis of various criteria, such as those discussed herein). Thus, in some embodiments, the droplets may be released in an ordered fashion.

Figure 3A:
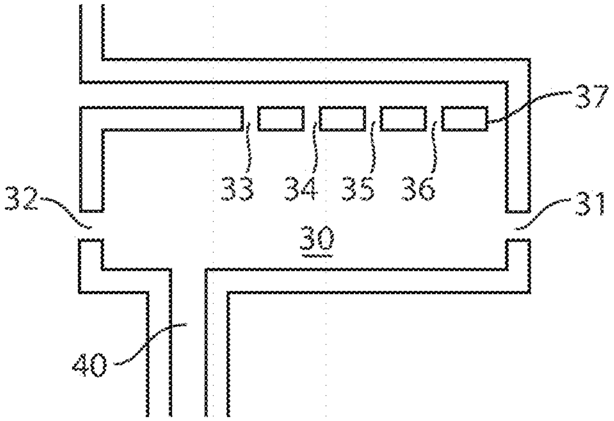
FIGS. 3A-3B illustrate a collection chamber with an actuation channel, in yet another embodiment of the invention.

One non-limiting example of such a collection chamber is shown in FIG. 3A. In this figure, actuation channel 40 fluidly connects to collection chamber 30. When a fluid enters into actuation channel 40 (e.g., by controlling a valve that controls the flow of fluid), droplets or other entities within collection chamber 30 may be urged out through inlet 31, for example, to enter a different microfluidic channel (e.g., such as the bypass microfluidic channel, as discussed above). The fluid entering from actuation channel 40 may be the same or a different fluid than the one within collection chamber 30. By controlling when a fluid enters into an actuation chamber, droplets within one collection chamber may be released while other droplets within other collection chambers are not released.

Figure 3B:
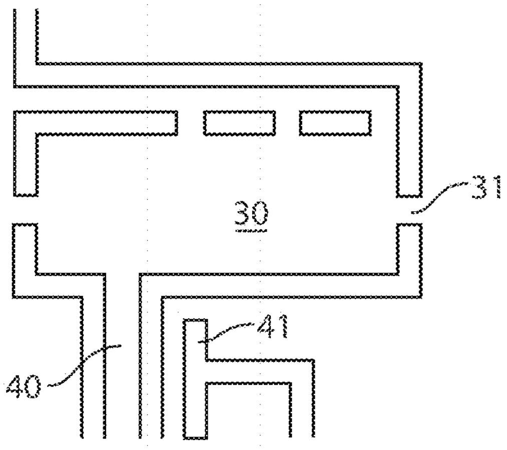

One non-limiting example of such a value that can be used to control fluid flow within actuation channel 40 is shown in FIG. 3B. In this figure, fluid flow within channel 40 is controlled by chamber 41. When a fluid enters chamber 41, e.g., using a suitable pump, the chamber may expand and partially or completely seal off channel 40. However, when the fluid is removed from chamber 41, e.g., using a suitable pump, the chamber may contract and thereby allow fluid to flow through channel 40 into collecting chamber 30. As a non-limiting example, the valve comprises a control channel for introducing a positive or reduced pressure, and is adapted to modulate fluid flow in the adjacent channel section by constricting or expanding the channel section. For example, the valve and/or the channel section may be formed in a flexible material and actuation of the valve may be achieved by applying a positive or reduced pressure to the valve to deformation of the valve and/or the channel section. Non-limiting examples of such valves may be found in U.S. Pat. Appl. Pub. No. 2011/0151578, incorporated herein by reference in its entirety. However, it should be understood that other methods of control are also possible in other embodiments of the invention, and fluid flow within a channel may be controlled, e.g., electrically or pneumatically, using a variety of approaches known to those of ordinary skill in the art.

Other methods may also be used to release droplets or other entities from a collection chamber. For example, in one set of embodiments, a bubble may be created inside the chamber, which can be used to displace one or more droplets out of the collection chamber. For instance, in some cases, a laser may be directed at a collection chamber or a portion of the collection chamber. The laser may be used to create a bubble, e.g., by heating a liquid to form a gas. The bubble may spatially expand and thereby cause one or more droplets or other entities to exit the chamber. The bubble may be created at any suitable position within the collection chamber, e.g., to direct droplets or other entities to one or more of the outlets.

In other embodiments, the droplets or other entities contained within a collection chamber may be manipulated using a variety of techniques; for example, various reactants may be added to the collection chamber (e.g., via one or more inlets to the collection chamber), the droplets may be burst (for example, using ultrasound or surfactants), two or droplets may be coalesced together, a droplet may be expanded or contracted, etc.

In yet another set of embodiments, fluid flow or pressure drops may be controlled to cause the exiting of one or more droplets or entities from a collection chamber. In some cases, one or more of the outlets from the collection chamber may be designed to have a lesser flow resistance than other outlets. However, the flow resistance may still be sufficient to trap droplets or other entities within the collection chamber. A change of fluid flow or pressure drop, for example, increasing the pressure drop across the collection chamber, may cause one or more droplets or other entities to deform or squeeze through an outlet, typically ones with lesser flow resistance than other outlets. In this way, droplets may be controllably released from the collection chamber.

A non-limiting example may be seen in FIG. 10. In FIG. 10A, a plurality of droplets is contained within a collection chamber. The horizontal outlet on the right of the collection chamber has a lower flow resistance than other outlets. In FIG. 10B, the pressure is increased, slightly deforming the droplets. In FIGS. 10C and 10D, the droplets begin to leave the collection chamber through the horizontal outlet due to the increase in applied pressure.

Figure 4A:
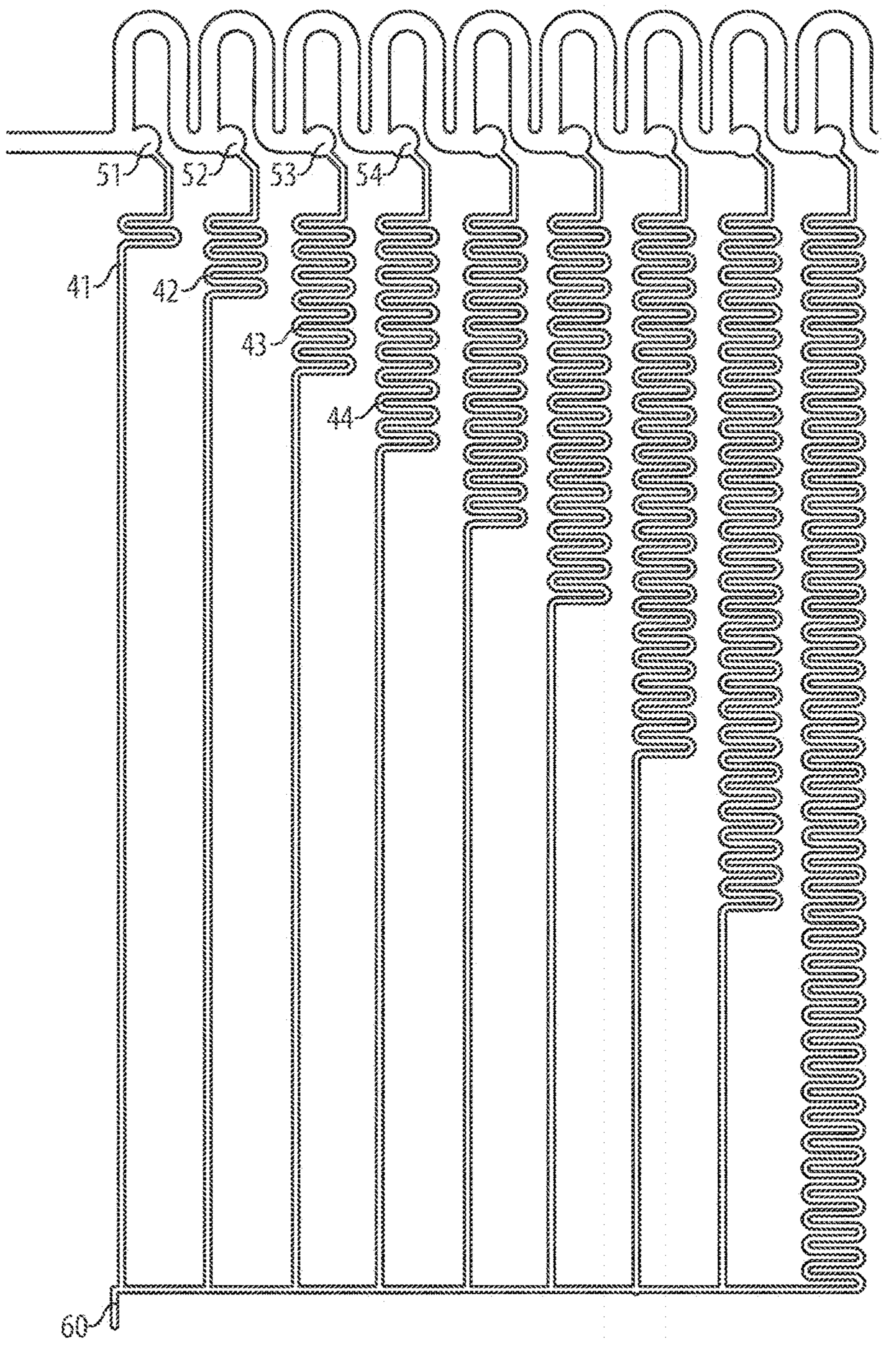
FIGS. 4A-B illustrate devices having a plurality of collection chambers and actuation channels, in still other embodiments of the invention.

In some embodiments, actuation channels fluidly connecting to different collection chambers may be fluidly connected to each other. In this way, droplets from multiple collection chambers may be released, e.g., simultaneously or sequentially, depending on when fluid enters each of the collection chambers, for instance, from actuation channels. One non-limiting example of a sequential release system is shown in FIG. 4A. In this figure, a series of collection chambers 51, 52, 53, . . . are each connected to separate actuation channels 41, 42, 43, . . . . In these figures, each of collection chambers 51, 52, 53, . . . is sized to contain only one droplet (or other entity), and the collection chambers are linearly arrayed; however, this is by way of example only, and in other embodiments, one or more (or all) of the collection chambers may be able to contain more than one droplet or other entity (and they need not necessarily all collect the same number of such entities), and the collection chambers may be arranged in any suitable configuration, e.g., in series, parallel, or any other suitable configuration. The collection chambers, as shown in this example, are in fluid communication with a common channel 60. A fluid entering into common channel 60 can pass through each of the separate actuation channels to cause release of droplets or other entities from their collection chambers, e.g., in a controlled manner.

It should be noted that in this example, actuation channels 41, 42, 43, . . . are not all the same length. The different lengths may cause fluid entering from common channel 60 to reach each of collection chambers 51, 52, 53, . . . at different points in time, thereby allowing sequential release of droplets or other entities from collection chambers 51, 52, 53, . . . at different times, rather than simultaneously, based for example, on when the entering fluid reaches each of the collection chambers. An example of the sequential release of droplets from such a system is shown in FIGS. 5A-5D, where a plurality of collection chambers contains droplets that are released in left-to-right fashion, progressing from FIG. 5A to FIG. 5D.

Figure 4B:
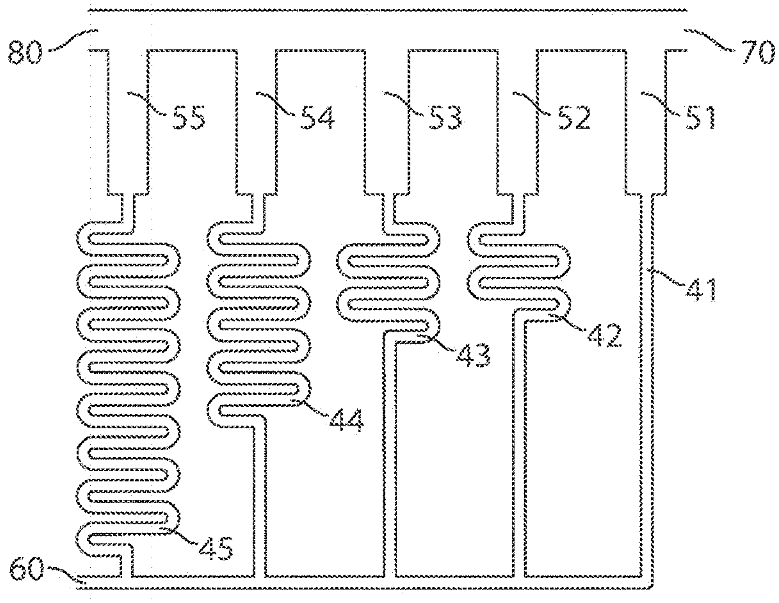
Figure 5A:
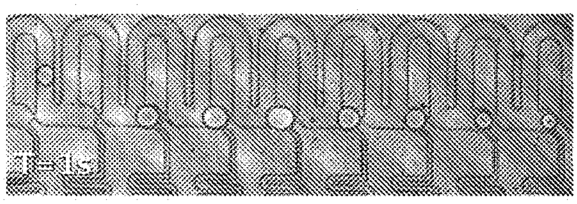
FIGS. 5A-5D illustrate release of droplets from a plurality of collection chambers, in one embodiment of the invention.
Figure 5B:
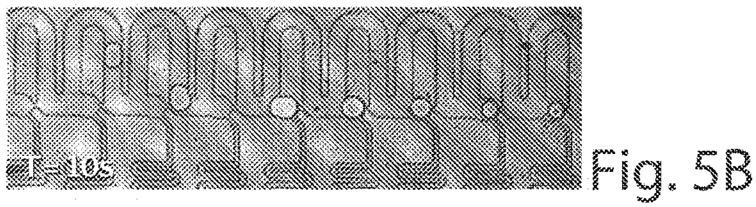
Figure 5C:
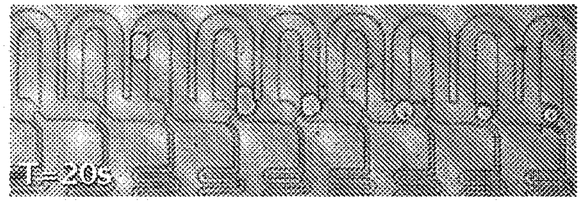
Figure 5D:
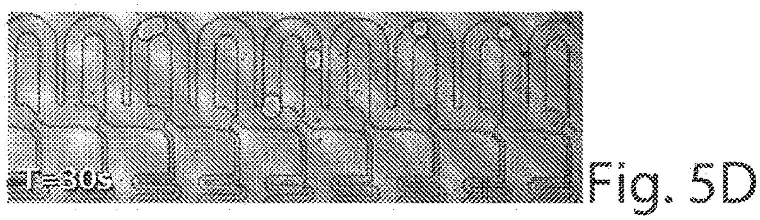
Figure 10A:
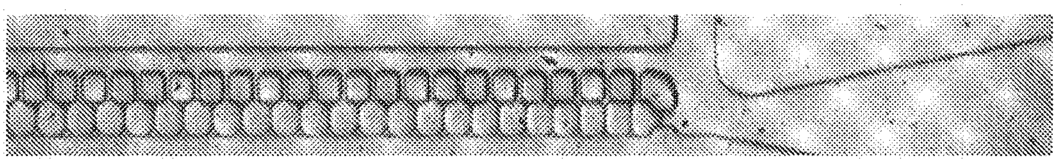
FIGS. 10A-10D illustrate an embodiment where droplets leave a collection chamber.
Figure 10B:
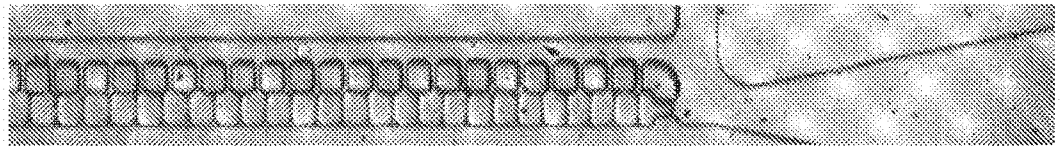
Figure 10C:
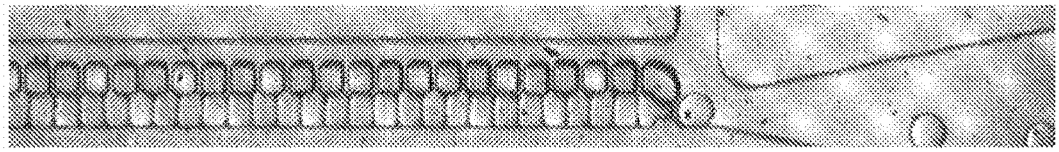
Figure 10D:
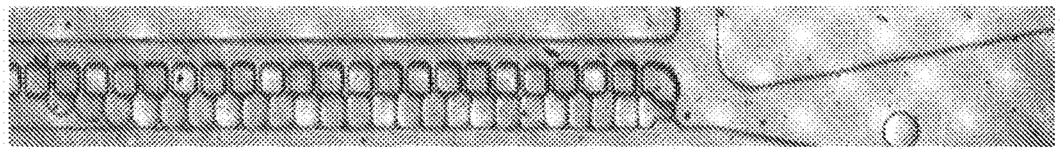

A similar system is shown in FIG. 4B. However, in this figure, the collection chambers are not necessarily connected using bypass channels, such as those previously discussed above. In this figure, fluid enters from inlet 70. The flow or hydrodynamic resistance in outlet 80 may be greater than the flow resistance through actuation channels 41, 42, 43, 44, and 45, such that fluid flows preferentially into collection chambers 51, 52, 53, 54, and 55 rather than through outlet

80, e.g., such that droplets or other entities contained within the fluid enter collection chambers. Actuation channels 41, 42, 43, 44, and 45 may act as fluid outlets from collection chambers 51, 52, 53, 54, and 55, but may be sized or otherwise prevent droplets or other entities from exiting therethrough. In such manner, the droplets or other entities may become trapped within the collection chambers. In addition, in some cases, actuation channels 41, 42, 43, 44, and 45 may have different flow resistance, such that fluid preferentially flows in collection chamber 51 relative to collection chamber 52, and collection chamber 52 relative to collection chamber 53, etc. This may be useful, e.g., to allow the collection chambers to fill sequentially (although in other embodiments, the collection chambers may also be filled randomly, e.g., if the resistances are substantially the same). Droplets or other entities may also be released from the collection chambers, e.g., by flowing a fluid through common channel 60 back into the collection chambers.

In addition, it should be noted that in some embodiments, droplets or other entities within the collection chamber may exit via the actuation channel. For example, in some embodiments, an actuation channel may be prevented from allowing fluid flow therethrough, e.g., through use of a valve that is partially or completely closed. Upon opening of the valve, droplets or other entities may flow through the actuation channel and thereby be released from the collection chamber.

As noted above, in some aspects, more than one collection chamber may be present within a device. The collection chambers may be arranged in any suitable configuration. For example, they may be arranged in a relatively linear fashion, such as is shown in FIG. 4A, or in a 2-dimensional matrix, such as is shown in FIG. 6A (and expanded in FIG. 6B). Such collection chambers may be arranged, for example, in series, parallel, or in any other suitable configuration. In some embodiments, for instance, a plurality of collection chambers may be in relatively close proximity to each other. For instance, the collection chambers may be arranged such that a branch point for one (e.g., branching between a collection chamber and a bypass channel) is also the branch point for a following collection chamber. Non-limiting examples of such configurations can be seen, for example, in FIG. 4 or 6B.

Thus, in certain embodiments, a microfluidic device as discussed herein may contain any number of collection chambers. The collection chambers may be able to independently collect the same, or different, numbers of droplets or other entities. The collection chambers of a microfluidic device may be connected to a common inlet and/or a common outlet, and/or to more than one inlet and/or more than one outlet. In some cases, there may also be actuation channels fluidly connected to some or all of the collection chambers, as discussed herein. Any number of suitable collection chambers may be present, and they may be positioned in any suitable location within the device, e.g., in a regular or irregular array, in 1-, 2-, or 3 dimensions. In some cases, the collection chambers may be arranged in a rectangular or other orderly array (e.g., a 1-dimensional array), e.g., to facilitate image acquisition of the collection chambers (e.g., by microscopy, well plate readers, or the like) and/or the droplets or other entities therein.

In some cases, the entities to be contained within collection chambers may be droplets, e.g., of a first fluid contained within a second or carrying fluid. In some cases, the first fluid and the second fluid are substantially immiscible. It is to be noted that a droplet is not necessarily spherical, but may assume other shapes as well, for example, depending on the external environment. The average or characteristic diameter of a droplet, in a non-spherical droplet, may be taken as the diameter of a perfect mathematical sphere having the same volume as the non-spherical droplet. The droplets may be created using any suitable technique, as discussed herein. In some cases, the droplet may be an isolated portion of a first fluid that is completely surrounded by a second fluid, or the droplet may have a size or cross-sectional area that is smaller than the channel containing the droplet. In other cases, however, the droplet may be somewhat larger, and may be deformed or "squashed" within a channel of the device.

As used herein, a "fluid" is given its ordinary meaning, i.e., a liquid or a gas. A fluid cannot maintain a defined shape and will flow during an observable time frame to fill the container in which it is put. Thus, the fluid may have any suitable viscosity that permits flow. If two or more fluids are present, each fluid may be independently selected among essentially any fluids (liquids, gases, and the like) by those of ordinary skill in the art.

In most, but not all embodiments, the droplets and the fluid containing the droplets are substantially immiscible. In some cases, however, they may be miscible. In some cases, a hydrophilic liquid may be suspended in a hydrophobic liquid, a hydrophobic liquid may be suspended in a hydrophilic liquid, a gas bubble may be suspended in a liquid, etc. Typically, a hydrophobic liquid and a hydrophilic liquid are substantially immiscible with respect to each other, where the hydrophilic liquid has a greater affinity to water than does the hydrophobic liquid. Examples of hydrophilic liquids include, but are not limited to, water and other aqueous solutions comprising water, such as cell or biological media, ethanol, salt solutions, etc. Examples of hydrophobic liquids include, but are not limited to, oils such as hydrocarbons, silicon oils, fluorocarbon oils, organic solvents etc. In some cases, two fluids can be selected to be substantially immiscible within the time frame of formation of the droplets. Those of ordinary skill in the art can select suitable substantially miscible or substantially immiscible fluids, using contact angle measurements or the like, to carry out the techniques of the invention. In some cases, the droplets may be stabilized using one or more surfactants. In some cases, immiscibility may be determined at equilibrium via phase separation or other suitable behavior, e.g., for two fluids that are exposed to each other under room temperature and normal pressure conditions (25° C. and 1 atm) and left undistributed for at least about a day.

As an example, if the carrier fluid is aqueous (e.g., a "water" phase), the fluid forming the droplets may be a non-aqueous fluid that is substantially immiscible within the aqueous fluid (e.g., an "oil" phase), or vice versa. However, it should be understood that the "water" phase is not limited to only pure water, but may be any fluid miscible in water, and/or the fluid may be water but contain other substances dissolved or suspended therein, etc. Similarly, the "oil" phase need not be a hydrocarbon oil, but may be any fluid that is substantially immiscible in water. Accordingly, the terms "oil" and "water" are used as terms of convenience, as is typically understood by those of ordinary skill in the art.

According to certain embodiments, the first droplets and/or the second droplets are stabilized using a surfactant. Typically, the surfactant is present at the interface between the fluid contained within a droplet and the liquid surrounding the droplet. In many cases, the surfactant has a relatively hydrophilic ("head") region and a relatively hydrophobic ("tail") region. In some cases, the surfactant may have more than one relatively hydrophilic region and/or more than one relatively hydrophobic region. The surfactant may be positioned at the interface and oriented such that the hydrophilic region is directed to the relatively hydrophilic fluid and the hydrophobic region is directed to the relatively hydrophobic fluid, thereby stabilizing the droplet within the liquid. After stabilization, for example, droplets directly physically contacting each other within a liquid may be unable to coalesce together to form a single, combined droplet, when in the absence of the surfactant, the droplets would otherwise coalesce together into a combined droplet, e.g., such that the fluids within the droplet are able to mix and/or such that the droplets can no longer be identified or distinguished as two separate droplets with a discrete interface between the droplets.

The first and second droplets may have the same surfactant, or different surfactants in some cases. Any of a wide variety of surfactants may be used, and such surfactants are commonly known to those of ordinary skill in the art and can be readily obtained commercially. Examples of surfactants may be found in, e.g., C. Holtze, et al., "Biocompatible Surfactants for Water-in-Fluorocarbon Emulsions," *Lab Chip,* 8(10):1632-9, 2008; J. Clausell-Tormos, et al., "Droplet-Based Microfluidic Platforms for the Encapsulation and Screening of Mammalian Cells and Multicellular Organisms," *Chem. & Biol.,* 15(5):427-437, 2008; or Int. Pat Apl. No. PCT/US07/17617, filed Aug. 7, 2007, entitled "Fluorocarbon Emulsion Stabilizing Surfactants," by Holtze, et al., published as WO 2008/021123 on Feb. 21, 2008, incorporated herein by reference.

Different types of carrier fluids can be used to carry droplets or other entities in a device. Carrier fluids can be hydrophilic (e.g., aqueous) or hydrophobic (e.g., an oil), and may be chosen depending on the type of droplet being formed (e.g., aqueous or oil-based) and the type of process occurring in the droplet (e.g., a chemical reaction). In some cases, a carrier fluid may comprise a fluorocarbon. In some embodiments, the carrier fluid is immiscible with the fluid in the droplet. In other embodiments, the carrier fluid is slightly miscible with the fluid in the droplet. Sometimes, a hydrophobic carrier fluid, which is immiscible with the aqueous fluid defining the droplet, is slightly water soluble. For example, oils such as PDMS and poly(trifluoropropylmethysiloxane) are slightly water soluble.

In various embodiments, the droplets may have an average or characteristic diameter of less than about 1 mm, less than about 500 micrometers, less than about 300 micrometers, less than about 200 micrometers, less than about 100 micrometers, less than about 75 micrometers, less than about 50 micrometers, less than about 30 micrometers, less than about 25 micrometers, less than about 20 micrometers, less than about 15 micrometers, less than about 10 micrometers, less than about 5 micrometers, less than about 3 micrometers, less than about 2 micrometers, less than about 1 micrometer, less than about 500 nm, less than about 300 nm, less than about 100 nm, or less than about 50 nm. The average diameter of the droplets may also be at least about 30 nm, at least about 50 nm, at least about 100 nm, at least about 300 nm, at least about 500 nm, at least about 1 micrometer, at least about 2 micrometers, at least about 3 micrometers, at least about 5 micrometers, at least about 10 micrometers, at least about 15 micrometers, or at least about 20 micrometers in certain cases. Combinations of any of the above are also possible. The "average diameter" of a population of droplets may be taken as the arithmetic average of the diameters of the droplets.

In certain embodiments, the fluidic droplets may be substantially monodisperse. For example, the fluidic droplets may have a distribution in diameters such that no more than about 5%, no more than about 2%, or no more than about 1% of the droplets have a diameter less than about 90% (or less than about 95%, or less than about 99%) and/or greater than about 110% (or greater than about 105%, or greater than about 101%) of the overall average diameter of the plurality of droplets. However, in other embodiments, the fluidic droplets are polydisperse.

In some embodiments, a droplet may contain a species such as a chemical, biochemical, or biological entity, a cell, a particle, a bead, gases, molecules, a pharmaceutical agent, a drug, DNA, RNA, proteins, a fragrance, a reactive agent, a biocide, a fungicide, a pesticide, a preservative, or the like. Thus, the species can be any substance that can be contained in a fluid and can be differentiated from the fluid containing the species. For example, the species may be dissolved or suspended in the fluid. The species may be present in one or more of the fluids. If the fluids contain droplets, the species can be present in some or all of the droplets. Additional non-limiting examples of species that may be present include, for example, biochemical species such as nucleic acids such as siRNA, RNAi and DNA, proteins, peptides, or enzymes. Still other examples of species include, but are not limited to, nanoparticles, quantum dots, fragrances, proteins, indicators, dyes, fluorescent species, chemicals, or the like. As yet another example, the species may be a drug, pharmaceutical agent, or other species that has a physiological effect when ingested or otherwise introduced into the body, e.g., to treat a disease, relieve a symptom, or the like. In some embodiments, the drug may be a small-molecule drug, e.g., having a molecular weight of less than about 2000 Da, less than about 1500 Da, less than about 1000 Da, or less than about 500 Da.

As mentioned, other entities besides droplets may be collected in other embodiments. For example, in some embodiments, the collection chambers may be used to collect particles, e.g., in addition to and/or instead of droplets. The particles may be, for example, metal, glass, polymeric, gel, or the like. In some embodiments, the particles may be monodisperse, and/or the particles may be spherical, or non-spherical in certain cases. In some cases, some or all of the particles may be microparticles and/or nanoparticles. Microparticles generally have an average diameter of less than about 1 mm (e.g., such that the average diameter of the particles is typically measured in micrometers), while nanoparticles generally have an average diameter of less than about 1 micrometer (e.g., such that the average diameter of the particles is typically measured in nanometers). In some cases, the nanoparticles may have an average diameter of less than about 100 nm. In some cases, the particles may have a distribution in diameters such that at least about 50%, at least about 60%, at least about 70%, about 80%, at least about 85%, at least about 90%, at least about 95%, at least about 97%, or at least about 99% of the droplets have a diameter that is no more than about 10% different, no more than about 7% different, no more than about 5% different, no more than about 4% different, no more than about 3% different, no more than about 2% different, or no more than about 1% different from the average diameter of the particles.

In one set of embodiments, the average diameter of the particles is less than about 1 mm, less than about 500 micrometers, less than about 300 micrometers, less than about 200 micrometers, less than about 100 micrometers, less than about 75 micrometers, less than about 50 micrometers, less than about 30 micrometers, less than about 25 micrometers, less than about 20 micrometers, less than about 15 micrometers, less than about 10 micrometers, less than about 5 micrometers, less than about 3 micrometers, less than about 2 micrometers, less than about 1 micrometer, less than about 500 nm, less than about 300 nm, less than about 100 nm, or less than about 50 nm. The average diameter of the particles may also be at least about 30 nm, at least about 50 nm, at least about 100 nm, at least about 300 nm, at least about 500 nm, at least about 1 micrometer, at least about 2 micrometers, at least about 3 micrometers, at least about 5 micrometers, at least about 10 micrometers, at least about 15 micrometers, or at least about 20 micrometers in certain cases. Combinations of these are also possible in some embodiments. The particles may also be spherical or non-spherical, and the average or characteristic diameter of a particle may be taken as the dimeter of a perfect sphere having the same volume as the particle.

Fluids may be delivered into the device (e.g., into one or more channels) from one or more fluid sources. Any suitable source of fluid can be used, and in some cases, more than one source of fluid is used. For example, a pump, gravity, capillary action, surface tension, electroosmosis, centrifugal forces, etc. may be used to deliver a fluid from a fluid source to the device. A vacuum (e.g., from a vacuum pump or other suitable vacuum source) can also be used in some embodiments. Non-limiting examples of pumps include syringe pumps, peristaltic pumps, pressurized fluid sources, or the like. The device can have any number of fluid sources associated with it, for example, 1, 2, 3, 4, 5, 6, 7, 8, 9, 10, etc., or more fluid sources. The fluid sources need not be used to deliver fluid into the same channel, e.g., a first fluid source can deliver a first fluid to a first channel while a second fluid source can deliver a second fluid to a second channel, etc.

A variety of materials and methods, according to certain aspects of the invention, can be used to form devices or components such as those described herein, e.g., channels such as microfluidic channels, chambers, etc. For example, various devices or components can be formed from solid materials, in which the channels can be formed via machining or micromachining, 3D-printing, film deposition processes such as spin coating and chemical vapor deposition, physical vapor deposition, laser fabrication, photolithographic techniques, etching methods including wet chemical or plasma processes, electrodeposition, 3D-printing, hot embossing, lamination, laser cutting, and the like. See, for example, *Scientific American,* 248:44-55, 1983 (Angell, et al).

In one set of embodiments, various structures or components of the devices described herein can be formed of materials such as glass, metals, polymers, etc. A non-limiting example of a polymer is an elastomeric polymer such as polydimethylsiloxane ("PDMS"), polytetrafluoroethylene ("PTFE" or Teflon®), or the like. For instance, according to one embodiment, a channel such as a microfluidic channel may be implemented by fabricating the fluidic system separately using PDMS or other soft lithography techniques (details of soft lithography techniques suitable for this embodiment are discussed in the references entitled "Soft Lithography," by Younan Xia and George M. Whitesides, published in the *Annual Review of Material Science,* 1998, Vol. 28, pages 153-184, and "Soft Lithography in Biology and Biochemistry," by George M. Whitesides, Emanuele Ostuni, Shuichi Takayama, Xingyu Jiang and Donald E. Ingber, published in the *Annual Review of Biomedical Engineering,* 2001, Vol. 3, pages 335-373; each of these references is incorporated herein by reference).

Other examples of potentially suitable polymers include, but are not limited to, polyethylene terephthalate (PET), polyacrylate, polymethacrylate, polycarbonate, polystyrene, polyethylene, polypropylene, polyvinylchloride, cyclic olefin copolymer (COC), polytetrafluoroethylene, a fluorinated polymer, a silicone such as polydimethylsiloxane, polyvinylidene chloride, bis-benzocyclobutene ("BCB"), a polyimide, a fluorinated derivative of a polyimide, or the like. Combinations, copolymers, or blends involving polymers including those described above are also envisioned. The device may also be formed from composite materials, for example, a composite of a polymer and a semiconductor material.

In some embodiments, various structures or components of the device are fabricated from polymeric and/or flexible and/or elastomeric materials, and can be conveniently formed of a hardenable fluid, facilitating fabrication via molding (e.g. replica molding, injection molding, cast molding, etc.). The hardenable fluid can be essentially any fluid that can be induced to solidify, or that spontaneously solidifies, into a solid capable of containing and/or transporting fluids contemplated for use in and with the fluidic network. In one embodiment, the hardenable fluid comprises a polymeric liquid or a liquid polymeric precursor (i.e. a "prepolymer"). Suitable polymeric liquids can include, for example, thermoplastic polymers, thermoset polymers, waxes, metals, or mixtures or composites thereof heated above their melting point. As another example, a suitable polymeric liquid may include a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety of polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, thiol-enes, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Non-limiting examples of silicone elastomers suitable for use according to the invention include those formed from precursors including the chlorosilanes such as methylchlorosilanes, ethylchlorosilanes, phenylchlorosilanes, etc.

Silicone polymers are used in certain embodiments, for example, the silicone elastomer polydimethylsiloxane. Non-limiting examples of PDMS polymers include those sold under the trademark Sylgard by Dow Chemical Co., Midland, MI, and particularly Sylgard 182, Sylgard 184, and Sylgard 186. Silicone polymers including PDMS have several beneficial properties simplifying fabrication of various structures of the invention. For instance, such materials are inexpensive, readily available, and can be solidified from a prepolymeric liquid via curing with heat. For example, PDMSs are typically curable by exposure of the prepolymeric liquid to temperatures of about, for example, about 65° C. to about 75° C. for exposure times of, for example, at least about an hour. Also, silicone polymers, such as PDMS, can be elastomeric and thus may be useful for forming very small features with relatively high aspect ratios, necessary in certain embodiments of the invention. Flexible (e.g., elastomeric) molds or masters can be advantageous in this regard.

One advantage of forming structures such as microfluidic structures or channels from silicone polymers, such as PDMS, is the ability of such polymers to be oxidized, for example by exposure to an oxygen-containing plasma such as an air plasma, so that the oxidized structures contain, at their surface, chemical groups capable of cross-linking to other oxidized silicone polymer surfaces or to the oxidized surfaces of a variety of other polymeric and non-polymeric materials. Thus, structures can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods useful in the context of the present invention, as well as overall molding techniques, are described in the art, for example, in an article entitled "Rapid Prototyping of Microfluidic Systems and Polydimethylsiloxane," *Anal. Chem.,* 70:474-480, 1998 (Duffy et al.), incorporated herein by reference.

Another advantage to forming channels or other structures (or interior, fluid-contacting surfaces) from oxidized silicone polymers is that these surfaces can be much more hydrophilic than the surfaces of typical elastomeric polymers (where a hydrophilic interior surface is desired). Such hydrophilic channel surfaces can thus be more easily filled and wetted with aqueous solutions than can structures comprised of typical, unoxidized elastomeric polymers or other hydrophobic materials.

In some aspects, such devices may be produced using more than one layer or substrate, e.g., more than one layer of PDMS. For instance, devices having channels with multiple heights and/or devices having interfaces positioned such as described herein may be produced using more than one layer or substrate, which may then be assembled or bonded together, e.g., e.g., using plasma bonding, to produce the final device. As a specific example, a device as discussed herein may be molded from masters comprising two or more layers of photoresists, e.g., where two PDMS molds are then bonded together by activating the PDMS surfaces using $O_2$ plasma or other suitable techniques. For example, in some cases, the masters from which the PDMS device is cast may contain one or multiple layers of photoresist, e.g., to form a 3D device. In some embodiments, one or more of the layers may have one or more mating protrusions and/or indentations which are aligned to properly align the layers, e.g., in a lock-and-key fashion. For example, a first layer may have a protrusion (having any suitable shape) and a second layer may have a corresponding indentation which can receive the protrusion, thereby causing the two layers to become properly aligned with respect to each other.

In another set of embodiments, a device (or at least a portion of a device) may be prepared by preparing a mold (e.g., via 3D printing or other suitable fabrication techniques), then forming a microfluidic device using the mold, e.g., by hardening a polymer around the mold, then removing the mold to produce the microfluidic device. Techniques for producing suitable molds by 3D printing will be known to those of ordinary skill in the art. In addition, other methods of making molds include, but are not limiting to, embossing, lamination, laser cutting, or the like.

In some aspects, one or more walls or portions of a channel may be coated, e.g., with a coating material, including photoactive coating materials. For example, in some embodiments, each of the microfluidic channels at the common junction may have substantially the same hydrophobicity, although in other embodiments, various channels may have different hydrophobicities. For example a first channel (or set of channels) at a common junction may exhibit a first hydrophobicity, while the other channels may exhibit a second hydrophobicity different from the first hydrophobicity, e.g., exhibiting a hydrophobicity that is greater or less than the first hydrophobicity. Non-limiting examples of systems and methods for coating microfluidic channels, for example, with sol-gel coatings, may be seen in International Patent Application No. PCT/US2009/000850, filed Feb. 11, 2009, entitled "Surfaces, Including Microfluidic Channels, With Controlled Wetting Properties," by Abate, et al., published as WO 2009/120254 on Oct. 1, 2009, and International Patent Application No. PCT/US2008/009477, filed Aug. 7, 2008, entitled "Metal Oxide Coating on Surfaces," by Weitz, et al., published as WO 2009/020633 on Feb. 12, 2009, each incorporated herein by reference in its entirety. Other examples of coatings include polymers, metals, silanes, or ceramic coatings, e.g., using techniques known to those of ordinary skill in the art.

As mentioned, in some (but not all) embodiments, some or all of the channels may be coated, or otherwise treated such that some or all of the channels, including the inlet and daughter channels, each have substantially the same hydrophilicity. The coating materials can be used in certain instances to control and/or alter the hydrophobicity of the wall of a channel. In some embodiments, a sol-gel is provided that can be formed as a coating on a substrate such as the wall of a channel such as a microfluidic channel. One or more portions of the sol-gel can be reacted to alter its hydrophobicity, in some cases. For example, a portion of the sol-gel may be exposed to light, such as ultraviolet light, which can be used to induce a chemical reaction in the sol-gel that alters its hydrophobicity. The sol-gel may include a photoinitiator which, upon exposure to light, produces radicals. Optionally, the photoinitiator is conjugated to a silane or other material within the sol-gel. The radicals so produced may be used to cause a condensation or polymerization reaction to occur on the surface of the sol-gel, thus altering the hydrophobicity of the surface. In some cases, various portions may be reacted or left unreacted, e.g., by controlling exposure to light (for instance, using a mask).

A variety of definitions are now provided which will aid in understanding various aspects of the invention. Following, and interspersed with these definitions, is further disclosure that will more fully describe the invention.

As noted, various embodiments of the present invention relate to droplets of fluid. The droplets may be of substantially the same shape and/or size, or of different shapes and/or sizes, depending on the particular application. It should be noted that a droplet is not necessarily spherical, but may assume other shapes as well, for example, depending on the external environment. A droplet, in some cases, may have a cross-sectional dimension that is smaller than the channel containing the droplet, although in other cases, the droplet may completely fill a cross-sectional portion of the channel.

As mentioned, in some, but not all embodiments, the systems and methods described herein may include one or more microfluidic components, for example, one or more microfluidic channels. "Microfluidic," as used herein, refers to a device, apparatus or system including at least one fluid channel having a cross-sectional dimension of less than 1 mm. In some cases, the channel may have a ratio of length to largest cross-sectional dimension of at least 3:1. A "microfluidic channel," as used herein, is a channel meeting these criteria. The "cross-sectional dimension" of the channel is measured perpendicular to the direction of fluid flow within the channel. Thus, some or all of the fluid channels in microfluidic embodiments of the invention may have maximum cross-sectional dimensions less than 2 mm, and in certain cases, less than 1 mm. In one set of embodiments, all fluid channels containing embodiments of the invention are microfluidic or have a largest cross sectional dimension of no more than 2 mm or 1 mm. In certain embodiments, the fluid channels may be formed in part by a single component (e.g. an etched substrate or molded unit). Of course, larger channels, tubes, chambers, reservoirs, etc. can be used to store fluids and/or deliver fluids. In one set of embodiments, the maximum cross-sectional dimension of the channel(s) containing embodiments of the invention is less than 500 microns, less than 200 microns, less than 100 microns, less than 50 microns, or less than 25 microns.

A channel can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and/or outlet(s). A channel may also have an aspect ratio (length to average cross sectional dimension) of at least 2:1, more typically at least 3:1, 5:1, 10:1, 15:1, 20:1, or more. An open channel generally will include characteristics that facilitate control over fluid transport, e.g., structural characteristics (an elongated indentation) and/or physical or chemical characteristics (hydrophobicity vs. hydrophilicity) or other characteristics that can exert a force (e.g., a containing force) on a fluid. The fluid within the channel may partially or completely fill the channel. In some cases where an open channel is used, the fluid may be held within the channel, for example, using surface tension (i.e., a concave or convex meniscus).

The channel may be of any size, for example, having a largest dimension perpendicular to fluid flow of less than about 5 mm or 2 mm, or less than about 1 mm, or less than about 500 microns, less than about 200 microns, less than about 100 microns, less than about 60 microns, less than about 50 microns, less than about 40 microns, less than about 30 microns, less than about 25 microns, less than about 10 microns, less than about 3 microns, less than about 1 micron, less than about 300 nm, less than about 100 nm, less than about 30 nm, or less than about 10 nm. In some cases the dimensions of the channel may be chosen such that fluid is able to freely flow through the article or substrate. The dimensions of the channel may also be chosen, for example, to allow a certain volumetric or linear flowrate of fluid in the channel. Of course, the number of channels and the shape of the channels can be varied by any method known to those of ordinary skill in the art. In some cases, more than one channel or capillary may be used. For example, two or more channels may be used, where they are positioned inside each other, positioned adjacent to each other, positioned to intersect with each other, etc.

The following are incorporated herein by reference: Int. Pat. Apl. Pub. No. WO 2010/151776, filed Jun. 25, 2010, entitled "Fluid Injection," by Weitz, et al.; and Int. Pat. Apl. Pub. No. WO 2015/200616, filed Jun. 25, 2015, entitled "Fluid Injection Using Acoustic Waves," by Weitz, et al. In addition, the following documents are incorporated herein by reference: U.S. patent application Ser. No. 11/360,845, filed Feb. 23, 2006, entitled "Electronic Control of Fluidic Species," by Link, et al., published as U.S. Patent Application Publication No. 2007/0003442 on Jan. 4, 2007; U.S. patent application Ser. No. 08/131,841, filed Oct. 4, 1993, entitled "Formation of Microstamped Patterns on Surfaces and Derivative Articles," by Kumar, et al., now U.S. Pat. No. 5,512,131, issued Apr. 30, 1996; priority to International Patent Application No. PCT/US96/03073, filed Mar. 1, 1996, entitled "Microcontact Printing on Surfaces and Derivative Articles," by Whitesides, et al., published as WO 96/29629 on Jun. 26, 1996; U.S. patent application Ser. No. 09/004,583, filed Jan. 8, 1998, entitled "Method of Forming Articles Including Waveguides via Capillary Micromolding and Microtransfer Molding," by Kim, et al., now U.S. Pat. No. 6,355,198, issued Mar. 12, 2002; International Patent Application No. PCT/US01/16973, filed May 25, 2001, entitled "Microfluidic Systems including Three-Dimensionally Arrayed Channel Networks," by Anderson, et al., published as WO 01/89787 on Nov. 29, 2001; U.S. Provisional Patent Application Ser. No. 60/392,195, filed Jun. 28, 2002, entitled "Multiphase Microfluidic System and Method," by Stone, et al.; U.S. Provisional Patent Application Ser. No. 60/424,042, filed Nov. 5, 2002, entitled "Method and Apparatus for Fluid Dispersion," by Link, et al.; U.S. Provisional Patent Application Ser. No. 60/461,954, filed Apr. 10, 2003, entitled "Formation and Control of Fluidic Species," by Link, et al.; International Patent Application No. PCT/US03/20542, filed Jun. 30, 2003, entitled "Method and Apparatus for Fluid Dispersion," by Stone, et al., published as WO 2004/002627 on Jan. 8, 2004; U.S. Provisional Patent Application Ser. No. 60/498,091, filed Aug. 27, 2003, entitled "Electronic Control of Fluidic Species," by Link, et al.; International Patent Application No. PCT/US2004/010903, filed Apr. 9, 2004, entitled "Formation and Control of Fluidic Species," by Link, et al., published as WO 2004/091763 on Oct. 28, 2004; International Patent Application No. PCT/US2004/027912, filed Aug. 27, 2004, entitled "Electronic Control of Fluidic Species," by Link, et al., published as WO 2005/021151 on Mar. 10, 2005; U.S. patent application Ser. No. 11/024,228, filed Dec. 28, 2004, entitled "Method and Apparatus for Fluid Dispersion," by Stone, et al., published as U.S. Patent Application Publication No. 2005-0172476 on Aug. 11, 2005; U.S. Provisional Patent Application Ser. No. 60/659,045, filed Mar. 4, 2005, entitled "Method and Apparatus for Forming Multiple Emulsions," by Weitz, et al.; U.S. Provisional Patent Application Ser. No. 60/659,046, filed Mar. 4, 2005, entitled "Systems and Methods of Forming Particles," by Garstecki, et al.; and U.S. patent application Ser. No. 11/246,911, filed Oct. 7, 2005, entitled "Formation and Control of Fluidic Species," by Link, et al.

In addition, the following documents are incorporated herein by reference in their entireties: Int. Pat. Apl. Pub. No. WO 2009/134395, WO 2009/139898, and WO 2007/030501. Also incorporated herein by reference in its entirety is U.S. Provisional Patent Application Ser. No. 62/323,544, filed Apr. 15, 2016, by Weitz, et al.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for collecting microfluidic entities in a collection chamber, comprising:

a first microfluidic channel and a second microfluidic channel, each of the channels being a channel that fluidly connects a first location and a second location, wherein the first location is a first intersection of the first microfluidic channel and the second microfluidic channel, and the second location is a second intersection of the first microfluidic channel and the second microfluidic channel, the second intersection being different from the first intersection, wherein the first microfluidic channel comprises the collection chamber having an inlet and two or more outlets, each of the inlet and the two or more outlets having a cross-sectional area, the cross-sectional area of the inlet being larger than each of the cross-sectional areas of each of the two or more outlets, wherein the collection chamber is constructed and arranged to collect microfluidic entities having a cross-sectional area greater than the cross-sectional areas of each of the two or more outlets and smaller than the cross-sectional area of the inlet, wherein the two or more outlets are spaced such that microfluidic entities collectable by the collection chamber can block only one outlet within the collection chamber at a time, wherein the first microfluidic channel has a first width, a first height, and a first length defining a first flow resistance, and the second microfluidic channel has a second width, a second height, and a second length defining a second flow resistance, wherein the first flow resistance is lower than the second flow resistance, wherein the second microfluidic channel consists of a single flow path connecting the first intersection to the second intersection, and wherein the first microfluidic channel further comprises an actuation channel such that, when fluid flows through the actuation channel, the fluid is able to cause entities within the collection chamber to exit the collection chamber via the inlet.

2. The apparatus of claim 1, wherein at least some of the microfluidic entities are microfluidic droplets.

3. The apparatus of claim 1, wherein at least some of the microfluidic entities are particles.

4. The apparatus of claim 1, wherein at least some of the microfluidic entities are gel particles.

5. The apparatus of claim 1, wherein the two or more outlets are spaced at a distance that is at least 75% of a width of the inlet.

6. The apparatus of claim 1, wherein the two or more outlets are spaced at a distance that is between 75% and 125% of a width of the inlet.

7. The apparatus of claim 1, wherein the two or more outlets are spaced at a distance that is at between 90% and 110% of a width of the inlet.

8. The apparatus of claim 1, wherein the two or more outlets -have a cross-sectional area that is within +/−20% of an average cross-sectional area of the two or more outlets.

9. The apparatus of claim 1, wherein adjacent outlets of the two or more outlets have a spacing that is within +/−20% of an average spacing of adjacent outlets.

10. The apparatus of claim 1, wherein the collection chamber is straight.

11. The apparatus of claim 1, wherein the collection chamber is constructed and arranged to collect the microfluidic entities single-file.

12. The apparatus of claim 1, wherein the microfluidic entities collectable by the collection chamber have a characteristic diameter that is within +/−20% of an average characteristic diameter of the microfluidic entities.

13. The apparatus of claim 1, wherein at least some of the two or more outlets are positioned within a wall of the collection chamber.

14. The apparatus of claim 1, wherein at least some of the two or more outlets fluidly connect to a common channel fluidly connected to the second location.

15. The apparatus of claim 1, wherein the collection chamber comprises a plurality of outlets on a wall orthogonal to a direction of bulk fluid flow into the collection chamber, and at least one outlet exiting the collection chamber in the direction of bulk fluid flow into the collection chamber.

16. The apparatus of claim 1, wherein the first microfluidic channel, in the absence of entities, has a flow resistance that is lower than a flow resistance of the second microfluidic channel, and when the first microfluidic channel contains as many microfluidic entities as outlets, has a flow resistance that is higher than a flow resistance of the second microfluidic channel.

17. The apparatus of claim 1, wherein the collection chamber is constructed and arranged to contain at least two microfluidic entities.

18. The apparatus of claim 1, wherein the apparatus comprises a plurality of collection chambers.

19. An apparatus for collecting microfluidic entities in a collection chamber, comprising:

a first microfluidic channel and a second microfluidic channel, each of the channels being a channel that fluidly connects a first location and a second location, wherein the first location is a first intersection of the first microfluidic channel and the second microfluidic channel, and the second location is a second intersection of the first microfluidic channel and the second microfluidic channel, the second intersection being different from the first intersection, wherein the first microfluidic channel comprises the collection chamber having an inlet and two or more outlets, each of the inlet and the two or more outlets having a cross-sectional width, the cross-sectional width of the inlet being larger than each of the cross-sectional widths of each of the two or more outlets, wherein the collection chamber is constructed and arranged to collect microfluidic entities, wherein the two or more outlets are spaced at a distance that is between 75% and 125% of the width of the inlet, wherein the first microfluidic channel has a first width, a first height, and a first length defining a first flow resistance, and the second microfluidic channel has a second width, a second height, and a second length defining a second flow resistance, wherein the first flow resistance is lower than the second flow resistance, and wherein the first microfluidic channel further comprises an actuation channel such that, when fluid flows through the actuation channel, the fluid is able to cause entities within the collection chamber to exit the collection chamber via the inlet.

20. The apparatus of claim 19, wherein at least some of the microfluidic entities are microfluidic droplets.

* * * * *